United States Patent [19]

Comey et al.

[11] Patent Number: 4,541,730
[45] Date of Patent: Sep. 17, 1985

[54] APPARATUS AND METHOD FOR TESTING EVACUATABLE DEWAR VESSELS

[75] Inventors: David M. Comey; Ronald R. Kusner, both of Concord, Mass.

[73] Assignee: Honeywell Inc., Minneapolis, Minn.

[21] Appl. No.: 496,142

[22] Filed: May 19, 1983

[51] Int. Cl.⁴ .................. G01F 1/68; G01N 25/20
[52] U.S. Cl. .................................... 374/43; 374/1; 374/12; 374/164
[58] Field of Search .............. 374/43, 44, 29, 1, 164, 374/12

[56] References Cited

U.S. PATENT DOCUMENTS

| | | | |
|---|---|---|---|
| 3,242,716 | 3/1966 | Webb | 374/44 |
| 4,059,982 | 11/1977 | Bowman | 374/44 |
| 4,221,125 | 9/1980 | Oliver et al. | 374/164 X |
| 4,255,962 | 3/1981 | Ashman | 374/44 X |

FOREIGN PATENT DOCUMENTS

| | | | |
|---|---|---|---|
| 0180384 | 3/1966 | U.S.S.R. | 374/43 |
| 0958937 | 7/1980 | U.S.S.R. | 374/43 |
| 0832434 | 5/1981 | U.S.S.R. | 374/43 |

Primary Examiner—Daniel M. Yasich
Attorney, Agent, or Firm—John S. Solakian; Laurence J. Marhoefer

[57] ABSTRACT

A device and process for determining the vacuum dewar heat load at cryogenic temperatures by a test made at room temperature are described. The test device comprises a heat source and integral temperature sensor mounted on a probe tip. The heat load of a test dewar at a desired test temperature (e.g. 77K) may be determined by measuring the heat load of the dewar under test at a more suitable test temperature (e.g. room temperature) and multiplying that room temperature heat load by a correlation factor. This correlation factor is empirically determined, and is dependent on the design of the test device and dewar, and the desired and actual test temperatures.

9 Claims, 2 Drawing Figures

APPARATUS AND METHOD FOR TESTING EVACUATABLE DEWAR VESSELS

BACKGROUND OF THE INVENTION

The present invention relates to heat load test devices and processes, and more specifically to those devices and processes used to test cryogenically cooled vacuum vessels ("dewars") which house infrared detectors.

High sensitivity thermal measurement or imaging systems generally utilize semiconductor detector materials which must be cryogenically cooled in order to achieve optimum performance. To effect this cooling, the detector assembly is mounted at the base of the bore ("endwell") of an evacuated vessel in thermal contact with a cryogenic cooler. To assure performance over the desired lifetime of each system, the vacuum integrity of each dewar vessel must be assured, and therefore must be tested.

In the past, each dewar has been tested by measuring the heat load of the dewar at 77 K.; typically by measuring the boil-off rate of liquid nitrogen which has been poured into the dewar bore (or "coldwell".) While this method is reliable; it has several disadvantages. First, if the dewar leaks or has not been properly evacuated, residual vapors within the vessel may condense on the detector array, possibly destroying it. Second, this procedure requires the use of expendable materials, is awkward and is time consuming. Finally, the test procedure becomes more complicated in order to provide any diagnostic or quantitative information other than static dewar performance.

It is accordingly a primary object of the present invention to provide an improved process and device for testing the heat load, and thereby the vacuum integrity of a dewar vessel. It is a further object of the present invention to provide an inexpensive and nondestructive means of testing the vacuum integrity of dewar vessels which also provides diagnostic information regarding expected performance or structural defects of the dewar.

SUMMARY OF THE INVENTION

The above and other objects of the present invention are achieved by providing a compact test device which combines an integral heat source and temperature sensor on a supporting structure which may be placed in thermal contact with the dewar endwell. The heat load of the dewar at any temperature (for example, room temperature) may be determined by measuring the change of dewar endwell temperature with respect to the amount of power input to the dewar endwell through the heat source. In one embodiment this may be accomplished by applying a fixed voltage to the heat source over a fixed time period while measuring the change in dewar endwell temperature. In a second embodiment, heat load may be determined by measuring the amount of power input through the heat source necessary to achieve a desired change in dewar endwell temperature.

The thermal resistance of an object with respect to its environment is dependent upon the materials and structure of the object, as well as the temperature at which the measurement is to be determined. Therefore, for each dewar design, and at a given vacuum level, there is a unique correlation between the dewar thermal resistance (from endwell to environment), at any two given endwell temperatures. These temperatures might be, for example, 77 K. (the desired liquid nitrogen test temperature) and another more desirable test temperature, for example, 297 K. (room temperature.)

Thus, for any dewar design a correlation may be determined empirically by comparing the thermal resistance, from endwell to environment, of the evacuated dewar at the desired test temperature (e.g. 77 K.) with the thermal resistance, from endwell to environment, of the evacuated dewar at the actual test temperature (e.g. 297 K.) Once the correlation is determined, the heat load of any given dewar may be easily determined by performing the heat load measurement at room temperature, rather than at 77 K.

This test may also be used to provide diagnostic informatin regarding dewar vacuum and structural integrity. By comparing the thermal resistance of a perfect dewar at room temperature when fully vented to the atmosphere to that when fully evacuated, the sensitivity of the test may be determined. In addition, any test result may be compared to the "perfect" test values in order to determine whether there is a large or small vacuum loss in the dewar. Since the heat capacity may also be determined from test results, the existence of gross internal structural defects, for example, a loose detector cold shield, might also be detected by using this device and test procedure.

Thus, the present invention makes use of the fact that for a given dewar design and endwell temprature, there is a unique correlation between the dewar thermal resistance and vacuum pressure, so that the heat load at the desired cryogenic test temperature may be rapidly determined by an easy, nondestructive test made at room temperature. In addition, the present invention has the advantage that diagnostic information may be obtained from the same test procedure.

BRIEF DESCRIPTION OF THE DRAWINGS

The above and other objects of the present invention are achieved in the illustrative embodiment as described with respect to the FIGS. in which.

DETAILED DESCRIPTION OF THE PREFERRED EMBODIMENT(S)

Figure 1:
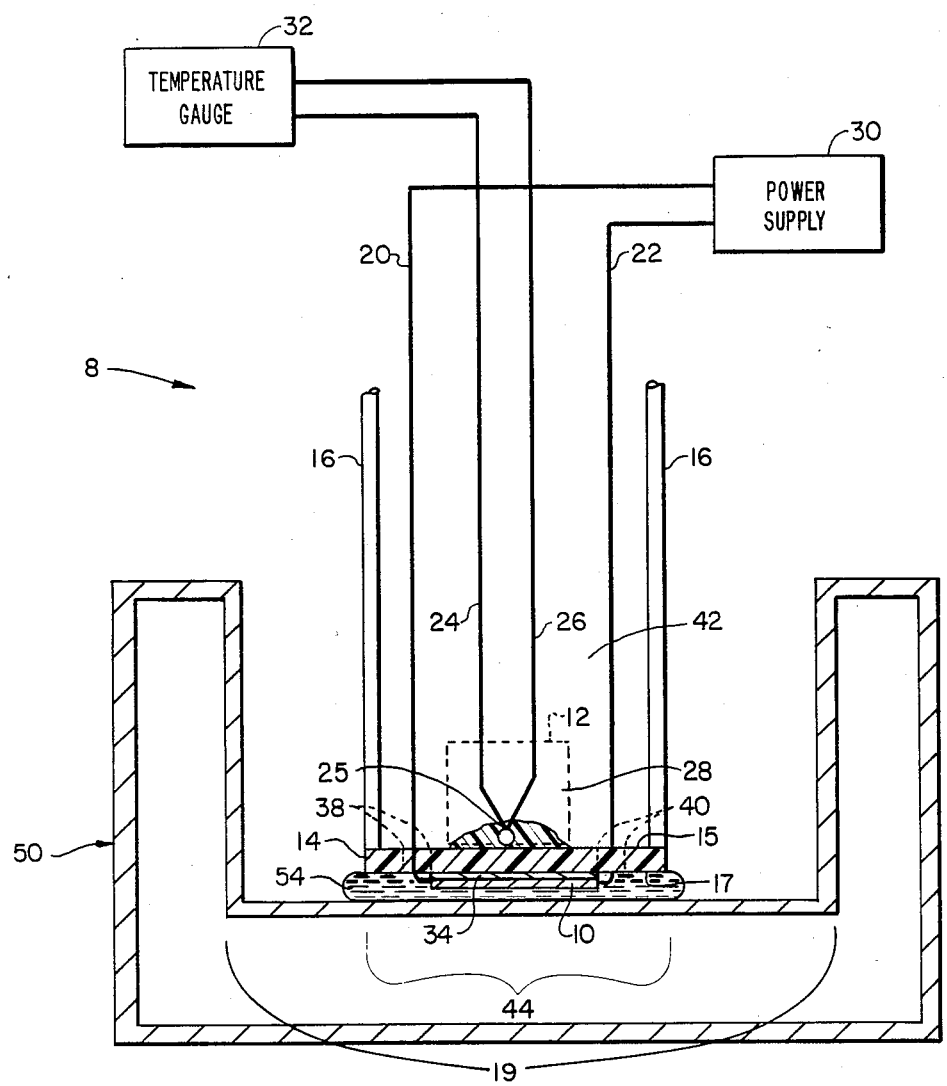
FIG. 1 shows a cross-section through the test device of the subject invention in place in a test dewar vessel.
Figure 2:
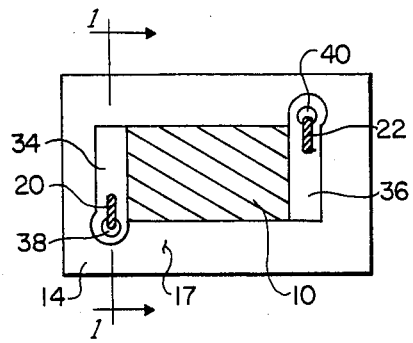
FIG. 2 shows an end view of the thin film heater and substrate of the test device of the subject invention.

Referring to FIGS. 1 and 2, the test device or probe 8 of the present invention includes a heating element 10 in combination with a temperature sensor 12 mounted on a substrate 14, encased by a protective structure 16. The end of device 8 is hereinafter referred to as tip 44. Power supply 30 drives heating element 10 via wires 20 and 22. Temperature gauge 32 displays the temperature measured by temperature sensor 12 through wires 24 and 26. The test device 8 is shown with the dewar vessel 50 in place. The size of device 8 has been illustrated in a larger scale relative to dewar vessel 50 in order to better illustrate the device of the present invention.

In one embodiment, heating element 10 may comprise a thin film nichrome heating element which is mounted on an electrically nonconductive substrate 14 comprising, for example, 0.020 inch thick alumina. Wires 20 and 22 which supply power to heating element 10 may comprise any low thermal conductivity electrical conductor, for example, constantan. Wires 20 and 22 extend through holes 38 and 40 in substrate 14, and are soldered onto contact pads 34 and 36 respectively on surface 17 of substrate 14. Contact pads 34 and 36 connect to heating element 10, as shown.

Temperature sensor 12 may comprise a thermocouple whose materials are selected for high sensitivity at the desired test temperature. For example, if device 8 were to be used at room temperature, thermocouple 12 might comprise a chromel wire 24 and a constantan wire 26 joined (welded) at junction 25 which is embedded in a thermally conductive mass 28, such as Epotech H54 epoxy, in thermal contact with surface 15 of substrate 14.

Protective structure 16 may comprise any casing material having the appropriate thermal properties and structural stability. As an example, structure 16 might comprise 0.125 inch diameter glass tubing having a 0.030 inch wall thickness. Structure 16 must be tightly sealed to substrate 14 such that any material used to improve the thermal contact between the probe device 8 and the vessel to be tested will not enter into chamber 42 and thereby alter the thermal characteristics of device 8.

The materials and design of device 8 are selected such that its thermal resistance and heat capacity are significantly less than those of the dewar design to be tested. The power applied to test device 8 is selected to maximize test sensitivity while minimizing test duration as well as the possibility of detector damage which might be caused by rapid temperature increase. The power capacity of heating element 10 must be adequate to obtain a measurable dewar temperature change considering the heat load and heat capacity of the dewar under test. Generally, the surface area of element 10 and surface 17 should be of comparable size to that of the dewar endwell 19.

Device 8 is calibrated as follows. The heat load of a representative sample of the dewar design is measured at the vacuum levels and temperatures of interest. The test may be made by conventional means, or using the test device of the present invention as described below. In one embodiment, the heat load of the dewar might be determined at 77 K. and 297 K., while the dewar is fully vented and fully evacuated (e.g. while actively pumping.) In another embodiment, heat load might be measured over a full range of vacuum pressures. In either case, a correlation may be determined for each vacuum pressure which relates the measured heat load of the dewar at the temperatures of interest to the thermal resistance at room temperature.

In one embodiment, device 8 may be used as follows. Referring to FIG. 1, dewar vessel 50 is inverted and mounted securely, as shown. A thermally conductive material 54 which has a low vapor pressure is placed on tip 44 of device 8. If the test were to be performed at room temperature, this material might comprise Dow-Corning DC 704 oil. The device or probe tip temperature is allowed to stabilize to a rate of change of temperature which is significantly less than that expected during the test. The probe temperature is recorded at temperature gauge 32 as power (Q) is supplied to test device 8 from power supply 30. The probe temperature (T) is recorded after the desired time interval(s), and the thermal resistance, which correlates to heat load and heat capacity are calculated.

In one embodiment, thermal resistance (TR) and heat capacity (HC) may be calculated as follows:

$$TR = \frac{T(ss) - T(0)}{Q}$$

and $$HC = \frac{Q \cdot t}{T(0 + t) - T(0)}$$

where T(O) and T(ss) are the initial and steady state temperatures of the dewar under test, respectively, Q is the power input (starting at t=O) to heating element 10, t is a period of time significantly less than the time necessary to reach T(ss), and T(O+t) is the temperature of the dewar after t amount of time has passed from the test initiation. By using the correlations obtained during the calibration process, the thermal resistance at room temperature may be used to determine the heat load at the desired test temperature.

Having described the invention, what is claimed as new and novel and for which it is desired to secure Letters Patent is:

1. A method for determining the thermal resistance of a dewar device of a predetermined design at a first cryogenic temperature by measurement of the thermal resistance of said dewar device made at a second temperature, said method comprising:
A. a calibration procedure comprising:
   i. measuring the thermal resistances of a substantially perfect dewar device of said predetermined design at said second temperature, alternately under the expected operating and expected failure conditions of said dewar device design;
   ii. measuring the thermal resistance of said substantially perfect dewar device at said first cryogenic temperature under said expected operating conditions of said dewar device design;
   iii. determining the sensitivity of said resistance of said substantially perfect dewar device to operation under said expected failure conditions by comparison of said thermal resistance of said substantially perfect dewar device at said second temperature under said expected operating and said expected failure conditions;
   iv. determining the calibration correlation between the thermal resistance of said substantially perfect dewar device at said first and said second temperatures under said expected operating conditions; and
B. a test procedure for determining the thermal resistance of a second dewar device, comprising an evacuatable vessel, of said predetermined design but of unknown quality, said test procedure comprising:
   i. measuring the thermal resistance of said second dewar device at said second temperature;
   ii. comparing the thermal resistance of said second dewar device taken at said second temperature with the thermal resistance of said first dewar device taken at said second temperature under said expected operating and said expected failure conditions so that the quality of said second dewar device may be ascertained, and so that the thermal conductivity of said second dewar device at said first cryogenic temperature may be approximated by comparison to said calibration correlation.

2. The method of claim 1 wherein said expected operating conditions comprise the maintainance of a substantially hard vaccuum within said dewar vessel and said failure conditions comprise complete loss of vaccuum within said dewar vessel.

3. The method of claim 1 wherein said expected operating conditions comprise a range of vaccuum pressures within said dewar vessel and said failure conditions comprise complete loss of vacuum within said dewar vessel.

4. The method of claim 1 wherein said second temperature is substantially room temperature (approximately 297 K. degrees.)

5. The method of claim 1 wherein the measurement of the thermal resistance of said substantially perfect dewar device at said cryogenic temperature is made by:
A. filling the bore of said dewar vessel with a known quantity of liquid nitrogen; and
B. measuring the rate of boil-off of said liquid nitrogen to determine the thermal resistance of said substantially perfect dewar device at said bore.

6. The method of claim 5 wherein said rate of boil-off is measured by use of a mass-flow meter.

7. The method of claim 1 wherein said measurement of the thermal resistance of said substantially perfect dewar device and said second dewar device at said second temperature are made by using a vacuum vessel thermal resistance test.

8. The method of claim 7 wherein the thermal resistance of said substantially perfect dewar device or said second dewar device is determined by:
A. placing a thermal resistance probe tip in thermal contact with the one of said dewar devices to be tested;
B. allowing the temperature of said probe tip and the temperature of said dewar device to be tested to substantially stabilize at said second temperature;
C. applying a voltage to the heat source of said thermal resistance probe tip;
D. measuring the temperature of said probe tip at selected intervals while said voltage is being applied to said heat source until said probe tip and said dewar device under test reach a substantially constant or steady state temperature; and
E. calculating the thermal resistance (TR) of said dewar device under test as follows:

$$TR = \frac{T(ss) - T(0)}{Q}$$

where T(O) and T(ss) are the initial and steady state temperatures of said dewar under test, respectively, and Q is the power input to said heat source of said thermal resistance probe tip.

9. A method for determining the thermal resistance of a dewar device of a predetermined design at a first cryogenic temperature by measurement of the thermal resistance of said dewar device made at a second temperature, said method comprising:
A. a calibration procedure comprising:
   i. measuring the thermal resistance of a substantially perfect dewar device of said predetermined design at said second temperature, alternately under the expected operating and expected failure conditions of said dewar device design;
   ii. measuring the thermal resistance of said substantially perfect dewar device at said first cryogenic temperature under said expected operating conditions of said dewar device design;
   iii. determining the sensitivity of said resistance of said substantially perfect dewar device to operation under said expected failure conditions by comparison of said thermal resistance of said substantially perfect dewar device at said second temperature under said expected operating and said expected failure conditions;
   iv. determining the calibration correlation between the thermal resistance of said substantially perfect dewar device at said first and said second temperature under said expected operating conditions;
B. a test procedure for determining the thermal resistance of a second dewar device of said predetermined design but of unknown quality, said test procedure comprising:
   i. measuring the thermal resistance of said second dewar device at said second temperature;
   ii. comparing the thermal resistance of said second dewar device taken at said second temperature with the thermal resistance of said first dewar device taken at said second temperature under said expected operating and said expected failure conditions so that the quality of said second dewar device may be ascertained, and so that the thermal conductivity of said second dewar device at said first cryogenic temperature may be approximated by comparison to said calibration correlation; and wherein
C. the thermal resistance of said substantially perfect dewar device or said second dewar device is determined by:
   i. placing a thermal resistance probe tip in thermal contact with the one of said dewar devices to be tested;
   ii. allowing the temperature of said probe tip and the temperature of said dewar device to be tested to substantially stabilize at said second temperature;
   iii. applying a voltage to the heat source of said thermal resistance probe tip;
   iv. measuring the temperature of said probe tip at selected intervals while said voltage is being applied to said heat source until said probe tip and said dewar device under test reach a substantially constant or steady state temperature; and
   v. calculating the thermal resistance (TR) of said dewar device under test as follows:

$$TR = \frac{T(ss) - T(0)}{Q}$$

where T(O) and T(ss) are the initial and steady state temperature of said dewar under test, respectively, and Q is the power input to said heat source of said thermal resistance probe tip.

* * * * *